United States Patent
Harjanto (10) Patent No.: US 7,668,902 B2
(45) Date of Patent: Feb. 23, 2010

(54) APPLICATION PROGRAMMING INTERFACE FOR IMPLEMENTING DIRECTORY SERVICE ACCESS USING DIRECTORY SERVICE MARKUP LANGUAGE

(75) Inventor: Andy Harjanto, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 10/449,573

(22) Filed: May 30, 2003

(65) Prior Publication Data

US 2004/0243668 A1 Dec. 2, 2004

(51) Int. Cl.
*G06F 15/16* (2006.01)
(52) U.S. Cl. .................. 709/203; 717/162; 719/328; 709/217; 709/230
(58) Field of Classification Search .................. None
See application file for complete search history.

(56) References Cited

U.S. PATENT DOCUMENTS

| | | | |
|---|---|---|---|
| 6,006,331 A | 12/1999 | Chu et al. | |
| 6,157,942 A | 12/2000 | Chu et al. | |
| 6,484,177 B1 | 11/2002 | Van Huben et al. | |
| 6,842,903 B1 * | 1/2005 | Weschler | 719/328 |
| 6,980,993 B2 * | 12/2005 | Horvitz et al. | 709/217 |
| 7,168,094 B1 * | 1/2007 | Fredell | 726/29 |
| 2002/0116454 A1 * | 8/2002 | Dyla et al. | 709/230 |
| 2003/0149653 A1 * | 8/2003 | Penney et al. | 705/37 |
| 2004/0083281 A1 * | 4/2004 | Makagon et al. | 709/223 |
| 2004/0083479 A1 * | 4/2004 | Bondarenko et al. | 719/310 |
| 2008/0086564 A1 * | 4/2008 | Putman et al. | 709/227 |

OTHER PUBLICATIONS

Caraveo, Shane. "Writing SMTP-Based SOAP Messages in PHP", Dr. Dobb's Journal, Oct. 1, 2002.*
Kleijnen, Stan et al. "An Open Web Services Architecture." Queue. vol. 1, Issue 1. ACM Press. 38-46.*

* cited by examiner

*Primary Examiner*—Vivek Srivastava
*Assistant Examiner*—Jeffrey R Swearingen
(74) *Attorney, Agent, or Firm*—Merchant & Gould P.C.

(57) ABSTRACT

A set of DSML application programming interface (DSML API) functions is provided to facilitate the implementation of DSML-based directory service access. The DSML API includes a DSML document API class for building or accessing a DSML payload, and a DSML connection API class that handles connection and transport to a DSML server. To access a directory service, the client calls functions of the DSML document API class to generate a DSML request payload, and calls functions of the DSML connection API to transport a packet with the DSML request payload according to a preselected connection protocol, such as SOAP, to the DSML server for forwarding to the directory service.

18 Claims, 4 Drawing Sheets

APPLICATION PROGRAMMING INTERFACE FOR IMPLEMENTING DIRECTORY SERVICE ACCESS USING DIRECTORY SERVICE MARKUP LANGUAGE

TECHNICAL FIELD

This invention relates generally to computer software, and more particularly to software programming for implementing Directory Service Markup Language (DSML)-based directory service access.

BACKGROUND OF THE INVENTION

Directory Service Markup Language is an OASIS (Organization for the Advancement of Structured Information Standards) approved standard specification that defines directory operations (e.g., Lightweight Directory Access Protocol (LDAP)) in XML form. The DSML v.2 specification has been widely adopted by many software and hardware vendors in the field of directory services.

In one popular approach to implementing directory service access using the DSML v.2 (e.g., the DSML Services for Windows (DSFW) of Microsoft Corporation), a DSML server is provided as an intermediate between a client and a directory service (e.g., the Active Directory of Microsoft Corporation). To use the directory service, the client sends a Simple Object Access Protocol (SOAP) packet with a DSML request as its payload over the network connection to the DSML server. The DSML server converts the received DSML request into a LDAP request, and sends the LDAP request to the directory service. After the directory service responds to the LDAP request, the DSML server converts the LDAP response into a DSML response payload, and return it to the requesting client in a SOAP response.

Although this scheme of enabling DSML-based access to the directory service is very successful, it requires the client to have the ability to construct DSML payloads and handle SOAP packets. To develop such client applications, the client application developers need to have intimate knowledge of DSML v.2 and SOAP, which is often a difficult condition to meet. Accordingly, there is a need to simplify the task of client application development to make it easier to utilize the DSML-based directory service access scheme as described above.

SUMMARY OF THE INVENTION

In view of the foregoing, the present invention provides a set of DSML application programming interface (DSML API) functions that may be called by a client application for handling DSML-based directory service requests and responses. In accordance with the invention, the DSML API includes a DSML document API class that concerns only building or accessing a DSML payload and is independent of network connection, and a DSML connection API class that handles connection and transport to a DSML server that is independent of DSML document processing. To access a directory service, the client calls API functions of the DSML document API class to generate a DSML request payload, and calls API functions of the DSML connection API class to construct a request packet with the DSML request payload and transporting the request packet according to a pre-selected connection protocol to the DSML server for forwarding to the directory service.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
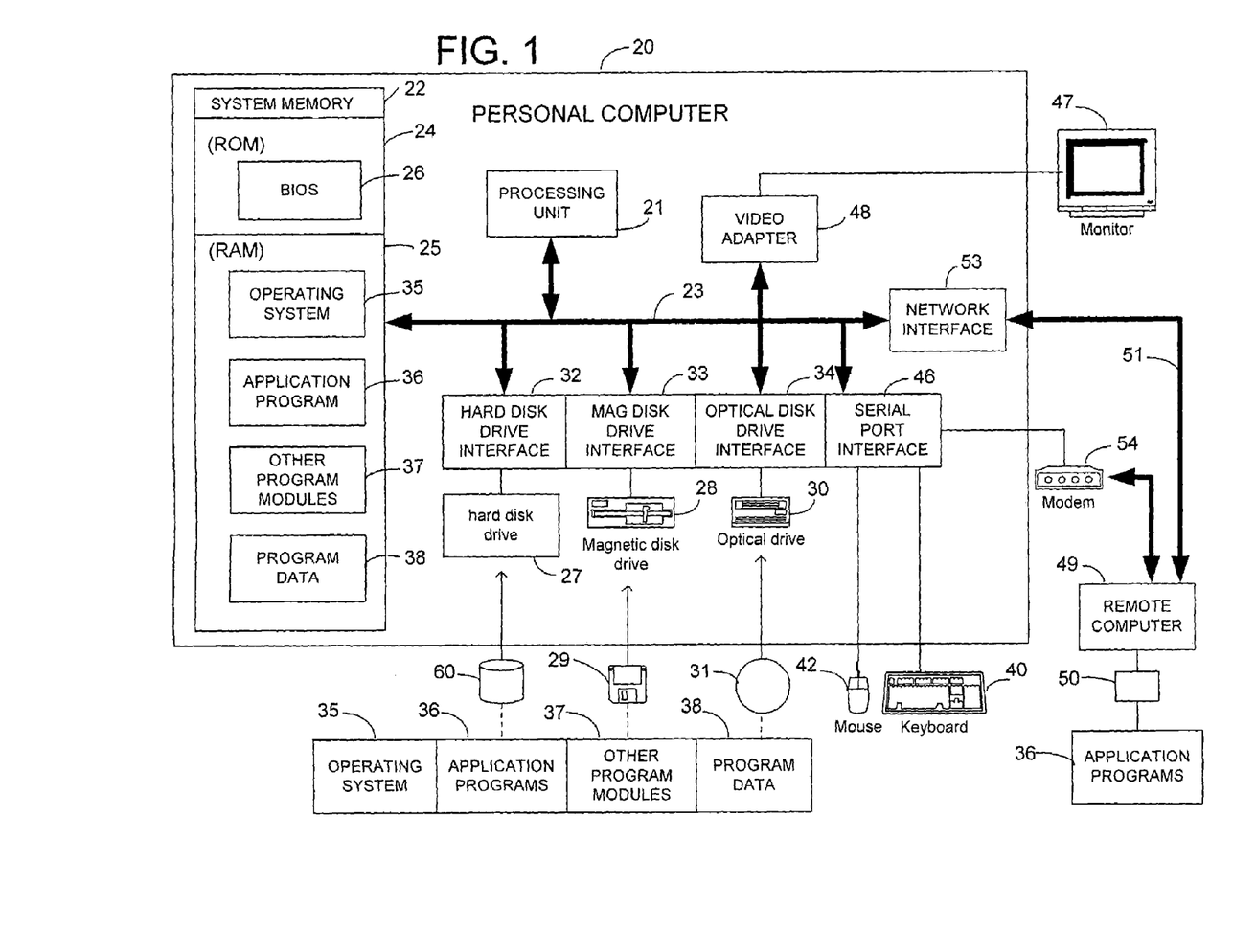
FIG. 1 is a block diagram generally illustrating an exemplary computer system on which an embodiment of the DSML API of the present invention may be implemented.

The following description begins with a description of a general-purpose computing device that may be used in an exemplary system for implementing the invention, and the DSML API of the invention will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
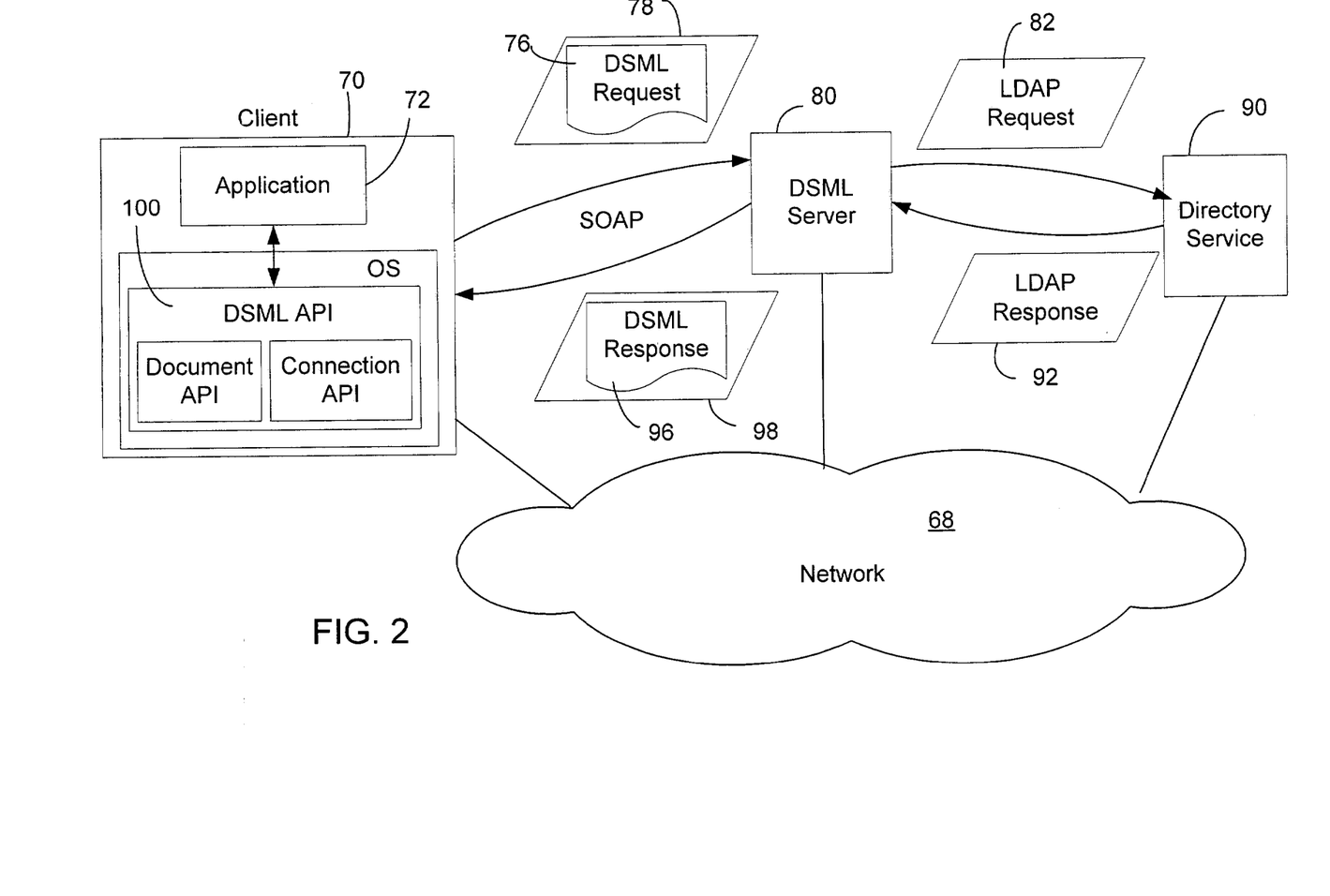
FIG. 2 is a schematic diagram showing an exemplary computer network having a client utilizing an embodiment of DSML API in accordance with the invention for DSML-based directory service access.

Referring to FIG. 2, the present invention is directed to a set of application programming interface (API) functions for a client computer 70 on a network 68 (e.g., the Internet) to build and transport directory service requests in the Directory Service Markup Language (DSML) format and to process directory service responses. Specifically, in a preferred embodiment as shown in FIG. 2, the client 70 is connected to a DSML server 80, which is in turn connected to a directory service 90. In this context, the DSML server 80 may be considered as a "gateway" for network clients to access the directory service 90 using DSML requests. An application program 72 on the client machine may want to access the directory service 90. For example, the application program may want to find the phone number of "John Smith" in a corporate directory via the Internet. As another example, the client device may be a small device such as a cellphone, and a user may use it to access the DSML server. To access the directory service 90, the client 70 forms a DSML request 76, and constructs a packet 78 according to a pre-selected transport protocol with the DSML request as its payload, and transports the request packet to the DSML server 80 under the selected transport/connection protocol. The transport/connection protocol may be, for example, the Simple Object Access Protocol (SOAP).

When the DSML server 80 receives the SOAP packet 78 that contains the DSML request 76, it converts the DSML request to a request according to the Lightweight Directory Access Protocol (LDAP), which is implemented by the directory service 90. The DSML server 80 then forwards the LDAP request 82 to the directory service 90. In response, the directory service 90 returns a response 92 in the LDAP format to the DSML server 80. When the DSML server 80 receives the LDAP response 92, it converts the response to a response n the DSML format, puts the DSML response 96 as the payload of a SOAP packet 98, and forwards the SOAP packet with the DSML response to the requesting client.

In accordance with a feature of the invention, the operating system of the client machine implements a set of application programming interface (API) functions that the application program 72 may call to build DSML requests and process DSML responses, and to handle the transport of the DSML requests and receipt of the DSML responses under the pre-selected protocol, such as SOAP over HTTP, SMTP, DIME, etc. This set of API functions is hereinafter referred to as the DSML API 100. The DSML API frees developers of client application programs from the task of programming functions for handling the DSML and transport operations, thereby facilitating the use of the DSML-based directory service access as described above by client applications.

By way of example, several scenarios are provided below to illustrate how the DSML API 100 may be used to enable DSML-based directory service access. It will be appreciated, of course, that the use of the DSML API is not limited to these scenarios. In a first scenario, a smart cell phone or PDA device needs to access directory information but does not contain an LDAP client. By including the DSML API on the device, application programs can be written to employ the API functions to form and send DSML requests for accessing the directory service through the DSML server. In a second scenario, a program on a personal computer needs to access a directory service through a firewall, but the firewall is not allowed to pass LDAP protocol traffic because it is not capable of auditing such traffic. By using the DSML API, applications on the personal computer can send SOAP packets with a DSML request payload, which can then pass through the firewall. In a third scenario, a programmer is writing an application using XML programming tools and techniques, and the application needs to access a directory. The DSML API is designed to allow a seamless integration with other XML programming. For instance, in DSML API object mode, the programmer is able to convert the DSML request to an XML document easily, allowing the programmer to manipulate it further using XML programming or tools.

Figure 3:
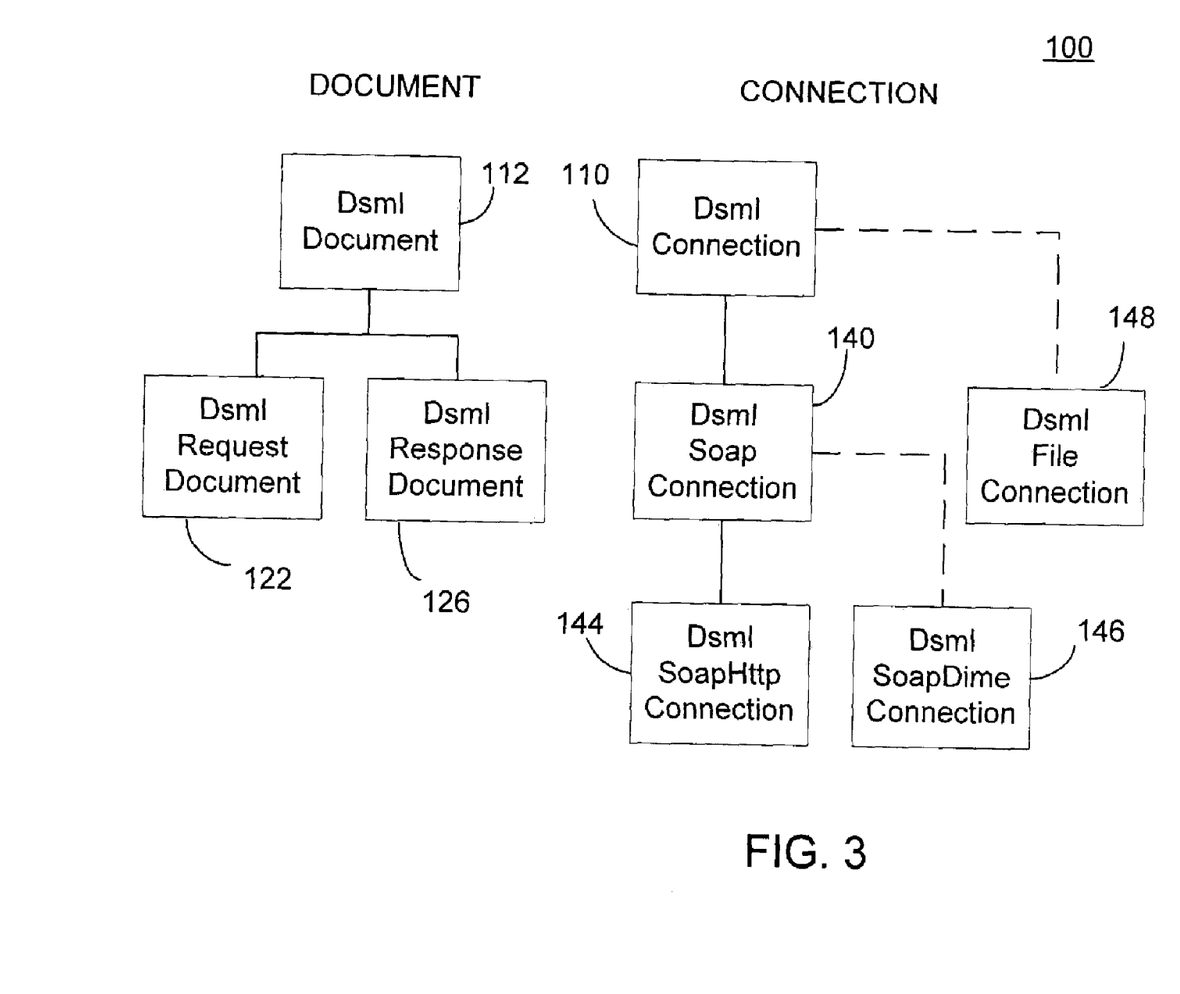
FIG. 3 is a schematic diagram showing a class hierarchy of an embodiment of DSML API in accordance with the invention.

Referring now to FIG. 3, in accordance with a feature of an embodiment of the invention, the DSML API separates the aspect of building/processing DSML documents from the aspect of dealing with the transport of the DSML documents, and makes them independent from each other. Specifically, the DSML API 100 has a set of classes that implements the DSML payload/message, and another set of classes for handling the transport. The transport may be, for example, SOAP over HTTP or DIME ("Direct Internet Message Encapsulation"), File, SMTP ("Simple Mail Transfer Protocol"), etc. The option "File" here means that the application reads or writes the DSML payload from or to a file, such as in the case of import and export. The separation of the DSML document processing from the transport operations allows future transport protocols to be implemented without the need for any modification of the classes for handling the DSML payload.

As illustrated in FIG. 3, the DSML API 100 has several top-level classes. As mentioned above, the DSML Connection class 110 deals with forming connections to the DSML server and handles remote and focal transport protocols. In other words, the DSML Connection class provides a way to transport DSML documents. The DSML Document class 112, on the other hand, concerns only accessing or building a DSML payload, and is independent of the connection aspect.

There are two classes, DSML Request Document and DSML Response Document, that inherit from the top-level DSML Document class. The DSML Request Document class 122 defines functions for building a DSML request payload, such as AddRequest, SearchRequest, etc. On the other hand, the DSML Response Document class 126 contains the corresponding response elements, such as AddResponse, ModifyResponse, SearchResponse, etc.

Figure 4:
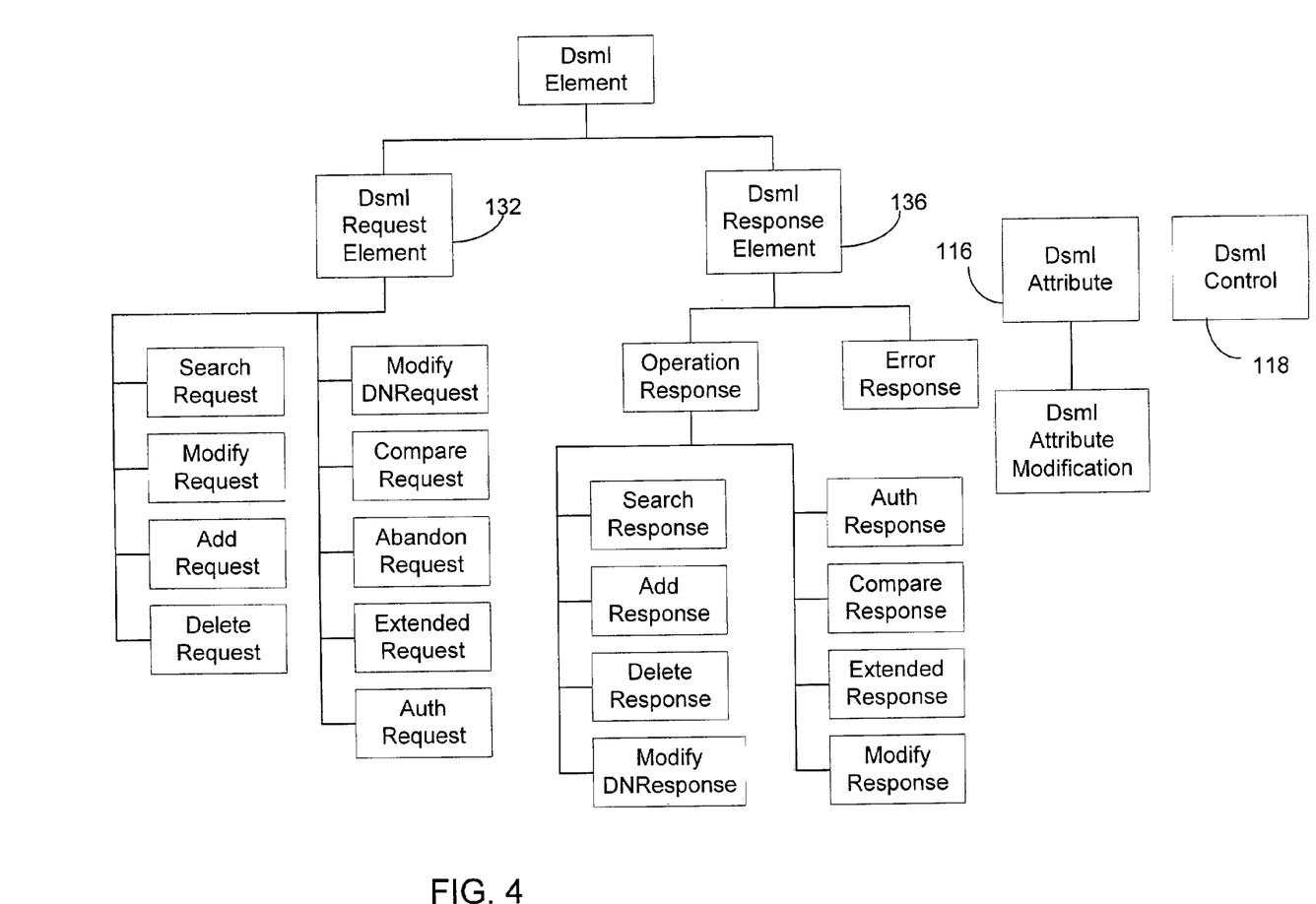
FIG. 4 is a schematic diagram showing class elements of the DSML API for building and manipulating a DSML payload.

Referring now to FIG. 4, each item in the DSML Document class is called the "DSML Element." Corresponding to the DSML requests and responses, there are two types of DSML Elements: DSML Request Element 132 and DSML Response Element 136. Both DSML Request Element and DSML Response Element further define more specialized classes. The DSML Elements for DSML documents are illustrated in FIG. 4 and will be described in greater below. Having the specialized classes allows a user to provide strongly typed classes for each operation, and to define specific constructors, properties, and methods, etc. FIG. 4 also shows a DSML Attribute class 116, and a DSML Control class 118, which are normally embedded into DSML Element derived classes.

Returning to FIG. 3, the DSML Connection class 110 is a base class for different DSML bindings. In one embodiment, the DSML API supports SOAP over HTTP, and has corresponding DsmlSoapConnection class 140 and a DsmlSoapHttpConnection classes 144. In alternative embodiments, the API may support other bindings, such as SOAP over DIME, File binding, etc., with corresponding classes 146, 148 in the hierarchy. When a new protocol is implemented, this arranges allows the connection class to be extended without disturbing the existing DSML API system.

By way of example, the class definitions in one implementation for some of the classes in FIG. 3, and some examples of how they may be used, are provided below.

The DSML Connection class and its subclasses are described first.

DsmlConnection
Overview:
DsmlConnection is an abstract class, which cannot be instantiated. Each DSML binding (e.g SOAP, File) is expected to derive from this class. This class is primarily deals with connection-oriented characteristics, such as credentials, resource location, etc.
Class Type: Abstract
Protocol: DSML
Public Constructors: No public constructor. This is an abstract class.
Public Properties:
NetworkCredentials Credentials
[Write-only] Allows the user to specify alternate credentials; if none is specified, it should default to the DefaultCredentials constant.
[Readonly] Identifies the server the object is connected to.
For example, it might represent http://abc.com/platforms/adssoap.dll for communicating with DSML Server via SOAP, file://c:\data\employees.xml for using DSML via File Binding.
X509CertificateCollection ClientCertificates
[Readonly] Allows the user to specify one or more client certificates to be sent for authentication purpose.
TimeSpan TimeOut
Specified a time span before the request times out. The default timeout is specified by the final non-abstract class.
Public Methods
abstract DsmlResponseDocument SendRequest(DsmlRequestDocument request)
Overridden by derived classes to provide a means of sending a single directory operation to the server and returning the server's response as a DsmlResponseDocurnent object. Will throw an exception on failure.

DsmlSoapConnection
Overview:
Since DSML/SOAP can be implemented over many different protocols, such as HTTP, DIME, SMTP, etc, this class provides a higher level entity that deals only with DSML and SOAP related features.
Derived From: DsmlConnection
Class Type: Abstract
Public Constructors: No public constructors.
Public Properties:
string SessionId

```
{
    get{ }
}
```

Active Session ID. null indicates there is no active session. Session is activated by calling BeginSession( ).
XmlNode SoapRequestHeader

```
{
    get{ }
    set{ }
}
```

This method allows the user to retrieve and set the SOAP Header(s) that will be attached to outgoing requests. The API will not attempt to parse these headers. The user may attach a sessionID header here if he or she so chooses, but the API will not use that sessionID as part of its native support for session IDs (BeginSession/EndSession). For example, if the user initiates a session via the BeginSession( ) method, and subsequently manually ends the session by attaching a EndSession header via this property, the API will still believe the session is active (since the EndSession( ) method was never called). The user should take care to avoid such inconsistencies.
XmlNode SoapBody

```
{
    get{ }
    set{ }
}
```

It allows the users to modify the SOAP Body. Sometimes, other messages are included along with DSML Body in the SOAP Body.
Public Methods
void BeginSession( )
Microsoft Dsml Session Support. It tells the DSFW (DSML Services for Windows) to start a sessions. DSML Session is used for stateless protocol such as HTTP against session-oriented features, such as Page Control.
Exception
Exception Class: InvalidOperationException
Thrown if the caller tries to BeginSession while a session is already open on that connection
Text: "A session is already active on this connection."
Exception Class: DsmlInvalidDocumentException
Server's response to BeginSession is not well-formed XML
Text: "The DSML document could not be parsed"
Exception Class: DsmlMissingSessionIdException
Server's response to BeginSession is missing the sessionID
Text: "The server failed to return a sessionID."
Exception class: WebException
  Communications failure with the DSML server.
void EndSession( )
Ends the session by sending an EndSession SOAP request to the DSML Server and clearing the SessionId property. If BeginSession has not been initiated, it throws an exception.
It is possible the DSML Server may have already terminated the session on its own (for example, due to idleness on the connection), and will therefore respond to a EndSession SOAP request with an error. In such an event, the EndSession method is still expected to clear the SessionId property on the LdapConnection object, in addition to returning the error to the caller (as a WebException).
Exception class: WebException
Communications failure with the DSML server.
Exception Class: InvalidOperationException
Thrown if caller tries to EndSession when no session is active
Text: "No session is currently active on this connection."

DsmlSoapHttpConnection
Overview:
DsmlSoapHttpConnection creates a connection to a DSML Gateway specified in the Uri. The user may specify alternate credentials, authentication type.
The necessary HTTP header "Content-Type: text/xml" will be automatically included by this class when sending a request.
The default timeout is 30 seconds.
Derived From: DsmlSoapConnection
Class Type: Concrete
Constructors:
DsmlSoapHttpConnection(DsmlDirectoryIdentifier ident)
Create Dsml Soap over HTTP connection for the server identified by ident. This identifier should represent a URI that is a DSML URLs setup by the Administrator. For example http://myserver01.example.com/DSML/adssoap.dll. The default credentials and the Windows Integrated Authentication will be used to connect to the DSML Server.
DsmlSoapHttpConnection(DsmlDirectoryIdentifier ident, NetworkCredential cred)
Create Dsml Soap over HTTP connection for a given server and Credentials.
DsmlSoapHttpConnection(
    DsmlDirectoryIdentifier ident, NetworkCredential cred, AuthTypes authType)
Create Dsml Soap over HTTP connection for a given server, Credentials, and authentication type.
Public Properties:
String SoapActionHeader;
Soap Action Header that will be sent along with other HTTP Headers. By default it sets to "#batchRequest"
AuthTypes AuthType;
Authentication Type.
The supported authentication types are: "Anonymous", "NTLM", "Basic", "Digest" and "Negotiate".
DirectoryIdentifier Directory
[Readonly] Returns a DsmlDirectoryIdentifier identifying the server that this object is connected to.
Public Methods:
DsmlResponseDocument SendRequest(DsmlRequestDocument request)
Override to send a single DsmlRequestDocument as a DSML batchRequest. Will throw an exception on failure.
Exception class: DsmlInvalidDocumentException
Client's request or Server's response was not well-formed DSML document.
Text: Invalid [Request|Response] Dsml Document
Exception class: WebException
Communications failure with the DSML server.
Exception Class: S.DS.Common.OperationException
The operation returned a failure code (i.e., a code other than success, compareTrue, compareFalse, or referral).
Text: "An error occurred in the operation."
Exception Class: S.DS.Dsml.ErrorResponseException
The DSML server returned an <errorResponse>
Text: "An <errorResponse> was returned."
DsmlResponseDocument SendRequest(DsmlRequestDocument request)
Sends the DsmlRequestDocument to the DSML Server. If it is successful, a DsmlResponseDocument will be returned. Otherwise an exception will be thrown.
Exception:
    Exception class: DsmlInvalidDocumentException
    Client's request or Server's response was not well-formed DSML document.
    Text: Invalid [Request|Response] Dsml Document
    Exception class: WebException
    Communications failure with the DSML server
DsmlResponseDocument SendRequest(Stream stream)
Sends a DSML request specified by stream. This method should dynamically stream the request to the DSML Server, i.e., it should not try to load the entire contents of the stream into memory before sending the request to the server.

Exception class: DsmlInvalidDocumentException
Client's request or Server's response was not well-formed DSML document.
Text: Invalid [Request|Response] Dsml Document
Exception class: WebException
Communications failure with the DSML server.

Several connection examples using the DSML API are provided below.

EXAMPLE 1

Connecting to a DSML Server and Sending a Document Request

DsmlSoapHttpConnection con=new DsmlSoapHttpConnection
(new DsmlDirectoryIdentifier(

---

```
DsmlSoapHttpConnection con = new DsmlSoapHttpConnection
    (new DsmlDirectoryIdentifier(
        "http://myserver.fabrikam.com/hr/adssoap.dll"));
DsmlRequestDocument req = new DsmlRequestDocument( );
//
// Construct the Dsml Request here ....
//
DsmlResponseDocument resp = con.SendRequest(req);
//
// Reading the response document here....
//
```

---

EXAMPLE 2

DSML Connection with SSL and Basic Authentication

DsmlSoapHttpConnection con=new DsmlSoapHttpConnection(
　new DsmlDirectoryIdentifier(
　"https://myserver.fabrikam.com/hr/adssoap.dll"),
　new NetworkCredential(username,password),
　AuthTypes.Basic);

EXAMPLE 3

DSML Connection with Session

DsmlSoapHttpConnection con=new DsmlSoapHttpConnection(
　new DsmlDirectoryIdentifier(
　"https://myserver.fabrikam.com/hr/adssoap.dll"),
　new NetworkCredential(username,password),
　AuthTypes.Basic);
DsmlRequestDocument doc1=. . . .
DsmlRequestDocument doc2=. . . .
con.BeginSession( );
con.SendRequest(doc1);
con.SendRequest(doc2);
con.EndSession( );
. . .

EXAMPLE 4

DSML Using Client-certificate Authentication

DsmlSoapConnection con=new DsmlSoapHttpConnection(
　new DsmlDirectoryIdentifier(
　"https://myserver.fabrikam.com/hr/adssoap.dll"),
　null,
　AuthTypes.Basic);
DsmlRequestDocument doc=. . . .
con.ClientCertificates.Add
　(X509Certificate.CreateFromCertFile(@"c:\user.cer"));
con. SendRequest(doc);

The DSML Document class and its subclasses are described next.

DsmlDocument
Overview:
　DsmlDocument is an abstract class to construct, manipulate a Dsml Document. It's a base class for both DsmlRequestDocument and DsmlResponseDocument. DsmlDocument supports collections and index. Each item in its collection is an object that is derived from DsmlElement. The objective of DsmlDocument is to provide a container that holds multiple DsmlElements for batched protocols, namely, DSML. It also holds the responses for a batched operation. Note that DsmlDocument and its derived classes are particular to the DSML protocol.
Derived From: Object
Class Type: Abstract
Constructors: No public constructor. This is an abstract class.
Public Properties:
Virtual String RequestID;
RequestID associated with the document.
Public Methods:
XmlDocument ToXml( )
　Return XmlDocument object that contains DsmlDocument in DSML v2 format.
Exceptions:
　Exception Class: DirectoryAttributeNullException
　Thrown if, while encoding the XML to send a request, DSML API encounters a null reference in the Values array of a DirectoryAttribute or DirectoryAttributeModification. Note that when they set the attributes on a AddRequest, etc., object, DSML API does check the Values array at that time and throw an ArgumentException if a null reference is found. However, since they can change the DirectoryAttribute/DirectoryAttributeModification object outside of DSML API (ref. vs. copy semantics), DSML API also has to account for this when it comes time to actually use the Values array.
　Text: "A null reference was detected in the Values array of a DirectoryAttribute or DirectoryAttributeModification object."

DsmlRequestDocument
Overview:
　DsmlRequestDocument contains zero or more DsmlRequestDocument-derived objects. The user may add, delete, modify, enumerate the DsmlRequestDocument before sending to the server.
　DsmlRequestDocument can be used with any DSML Binding classes to transport the document; for example DsmlSoapHttpConnection. DsmlRequestDocument corresponds to the BatchRequest type defined in the DSMlv2 XSD.
Derived From: DsmlDocument
Implements: IList, IEnumerable
Class Type: Concrete
Constructors:
DsmlRequestDocument( )
Creating an empty request document.
Public Properties:
Collection/Index Related Properties bool IList:IsFixedSize.
Request document will not be a fixed size; while Response document will be a fixed size.

bool ILIst:IsReadOnly.
  Request document will be read and write; while Response document will be readonly.
object ICollection.SyncRoot.
  Gets an object that can be used to synchronize access to the collection object
bool ICollection.IsSynchronized.
  Indicates whether access to this collection object is synchronized
public int Count.
  Gets the number of objects in side this collection object
int ICollection.Count.
  Gets the number of objects in side this collection object
public DsmlRequestDocument this[int index].
  Gets or sets the element at the specified index
object IList.this[int index]
  Gets or sets the element at the specified index
DsmlDocumentProcessing DocumentProcessing
  Optional Either DsmlDocumentProcessing.Sequential or DsmlProcessing.Parallel. The default is DsmlDocumentProcessing.Sequential.
DsmlResponseOrder ResponseOrder
  Optional. It could be either DsmlResponseOrder.Sequential or DsmlResponseOrder.Unordered. The default is DsmlResponseOrder.Sequential
DsmlErrorProcessing ErrorProcessing
Optional. It could be either DsmlErrorProcessing.Resume or DsmlResponseOrder.Exit. The default is DsmlErrorProcessing.Exit
Public Methods:
Collection/Index Related Methods
public lEnumerator GetEnumerator( )
  Returns an enumerator that can enumerate this collection
public int Add(DsmlRequestDocument request)
  Add an element to this collection object
int IList.Add(object request)
  Add an element to this collection object
void Clear( )
  Removes all items from this collection object
void IList.Clear( )
  Removes all items from this collection object
public bool Contains(DsmlRequestDocument value)
  Determins whether this collection object contains a specific value
bool IList.Contains(Object value)
  Determins whether this collection object contains a specific value
public int IndexOf(DsmlRequestDocument value)
  Determines the index of a specific item in the collection object
int IList.IndexOf(object value)
  Determines the index of a specific item in the collection object
public void Insert(int index,DsmlRequestDocument value)
  Insert the item to the collection object at the specified position
void IList.Insert(int index,object value)
  Insert the item to the collection object at the specified position
public void Remove(DsmlRequestDocument value)
  Removes the first occurrence of a specific DsmlRequestDocument object in the collection
void IList.Remove(object value)
  Removes the first occurrence of a specific DsmlRequestDocument object in the collection
void RemoveAt(int index)
  Removes the item at the specified position
void IList.RemoveAt(int index)
  Removes the item at the specified position
public void CopyTo(DsmlRequestDocument[ ] value, int i)
  Copies the elements of the collection object to a DsmlRequestDocument array
void ICollection.CopyTo(Array value, int i)
  Copies the elements of the collection object to an array DsmlResponseDocument
Overview:
  DsmlResponseDocument is generated by sending the DsmlRequestDocument.
  DsmlResponseDocument is readonly collection that contains zero or more
  DsmlResponseDocument-derived objects.
Derived From: DsmlDocument
Class Type: Concrete
Constructors: None. DsmlResponseDocument cannot be created by the user.
Public Properties:
bool IsErrorResponse
  [Read-only] Return whether an error response has occurred.
bool IsOperationError
  [Read-only] Return whether an operation error response has occurred.
String RequestID {set { . . . }}
  The inherited (from DsmlDocument) RequestID property is overloaded to throw an exception on set, making it effectively read-only.
  Exception Class: NotSupportedException
  Text: "The property is read-only".
Collection/Index Related Properties.
object ICollection.SyncRoot.
  Gets an object that can be used to synchronize access to the collection object
bool ICollection.IsSynchronized.
  Indicates whether access to this collection object is synchronized
public int Count.
  Gets the number of objects in side this collection object
int ICollection.Count.
  Gets the number of objects in side this collection object
public DsmlResponseDocument this[int index]
  Readonly. Gets the element at the specified index
Public Methods:
Collection/Index Related Methods.
public lEnumerator GetEnumerator( )
  Returns an enumerator that can enumerate this collection
public void CopyTo(DsmlResponseDocument[ ] value, int i)
  Copies the elements of the collection object to a DsmlResponseDocument array
void ICollection.CopyTo(Array value, int i)
  Copies the elements of the collection object to an array
DsmlResponseDocument this[this string requestID]
  [Read-only] Returns the DsmlResponseDocument with the specified requestID.
Exception class: InvalidOperationException
  Thrown if the collection contains more than one DsmlResponseDocument with the specified requestID.
Text: "Multiple responses match the specified requestID."
  The following are examples of how the DSML Document classes may be called.
DsmlRequestDocument doc=new DsmlRequestDocument( );

```
doc.ErrorProcessing=DsmlErrorProcessing.Resume;
//adding the request element to the document
doc.Add(new AddRequest( . . . ));
doc.Add(new SearchRequest( . . . ));
. . .
//demonstrate retrieving element via position;
DsmlRequestElement element=doc[1]; //retrieve the second
    request element.
DsmlSoapHttpConnection con=new DsmlSoapHttpConnec-
    tion(
new    DsmlDirectoryIdentifier("http://a.b.com/os/adssoap.
    dll"));
DsmlResponseDocument resp=con.SendRequest(doc);
//Getting the responses
AddResponse add=(AddResponse) resp[0];
SearchResponse src=(SearchResponse) resp[1];
```

```
// enumerating the response
foreach( DsmlResponseElement r in resp )
{
    Console.WriteLine(r);
}
```

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable storage medium storing computer-executable instructions, that when executed by a computing device, cause the computing device to perform a method for generating and sending Directory Service Markup Language (DSML) requests to a DSML server that provides a directory service, the method comprising:
    calling, by the computing device, a constructor Application Programming Interface (API) function that constructs a DSML request object, the constructor API function defined in a DSML request document class, the DSML request object being an instance of the DSML request document class, the DSML request document class defining functions for building DSML request documents, the DSML request object representing a DSML request document;
    in response to calling the constructor API function, receiving, by the computing device, the DSML request object;
    calling, by the computing device, a function of the DSML request object that adds a DSML element to the DSML request document, the function being one of the functions defined by the DSML request document class; and
    calling, by the computing device, a send API function that sends a request packet to a DSML server, the send API function defined in a connection API class, the request packet having the DSML request document as a payload under a networking protocol.

2. A computer-readable storage medium as in claim 1, wherein the networking protocol includes Simple Object Access Protocol (SOAP) and wherein the request packet is sent using SOAP over Hypertext Transfer Protocol (HTTP).

3. A computer-readable storage medium as in claim 1, wherein the networking protocol includes SOAP and wherein the request packet is sent using SOAP over Direct Internet Message Encapsulation (DIME).

4. A computer-readable storage medium as in claim 1, wherein the request packet is sent to the DSML server for forwarding to the directory service.

5. A computer-readable storage medium as in claim 1, having further computer-executable instructions that, when executed by the computing device, cause the computing device to perform the steps of:
    receiving, by the computing device, a DSML response object that represents a DSML response document that is responsive to the DSML request document; and
    calling, by the computing device, a function of the DSML response object to process the DSML response document.

6. The computer-readable storage medium of claim 5,
    wherein the DSML element is an AddRequest element;
    wherein the DSML response document includes an AddResponse element; and
    wherein the method further comprises: in response to calling the function of the DSML response object to process the DSML response document, receiving, at the computing device, an AddResponse object that represents the AddResponse element.

7. A computer-readable storage medium as in claim 1, wherein the DSML request document class and the connection API class are separate and independent from each other.

8. The computer-readable storage medium of claim 1, wherein the DSML element is a DSML element in a group consisting of: an AddRequest element, a ModifyRequest element, and a SearchRequest element.

9. A method for generating and sending Directory Service Markup Language (DSML) requests to a DSML server that provides a directory service, the method comprising:
    calling, at a client application operating at a computing device, a constructor Application Programming Interface (API) function that constructs a DSML request object, the constructor API function defined in a DSML request document class, the DSML request object being an instance of the DSML request document class, the DSML request document class defining functions for building DSML request documents, the DSML request object representing a DSML request document;
    in response to calling the constructor API function, receiving, at the client application, the DSML request object;
    calling, at the client application, a function of the DSML request object that adds a DSML element to the DSML request document, the function being one of the functions defined by the DSML request document class;
    calling, at the client application, a connection class constructor function that constructs a connection object, the connection class constructor function defined in a connection API class, the connection API class defining functions for manipulating connections, the connection object being an instance of the connection API class, the connection object representing a connection under a networking protocol to the DSML server;
    calling, at the client application, a send function of the connection object, the send function being one of the functions defined by the connection API class, the send function sending a request packet to the DSML server, the request packet having the DSML request document as a payload under the networking protocol.

10. A method as in claim 9, wherein the networking protocol includes Simple Object Access Protocol (SOAP).

11. A method as in claim 10, wherein the request packet is sent using SOAP over Hypertext Transfer Protocol (HTTP).

12. A method as in claim 10, wherein the request packet is sent using SOAP over Direct Internet Message Encapsulation (DIME).

13. A method as in claim 9, wherein the computing device sends the request packet to the DSML server for forwarding to the directory service.

14. A method as in claim 9, further comprising the steps of:
in response to calling the send function of the connection object, receiving, at the client application, a DSML response object, the DSML response object having functions to manipulate a DSML response document that is responsive to the DSML request document; and
calling, at the computing device, one of the functions of the DSML response object to process the DSML response document.

15. A method as in claim 9, wherein the DSML request document class and the connection API class are separate and independent from each other.

16. A method comprising:
receiving, at a computing device, an invocation, by an application, of a Directory Service Markup Language (DSML) request constructor function defined in a document Application Programming Interface (API) class;
in response to receiving the invocation of the DSML request constructor function, returning, by the computing device, to the application a first DSML request object that represents a first DSML request document;
receiving, at the computing device, an invocation by the application of an add request function of the first DSML request object,
in response to receiving the invocation of the add request function, automatically adding, at the computing device, to the first DSML request document a DSML add request element that specifies that an entry is to be added to a directory;
receiving, at the computing device, an invocation by the application of a Hypertext Transfer Protocol (HTTP) connection constructor function defined in a connection API class, the invocation of the HTTP connection constructor function specifying a Uniform Resource Locator (URL) of a DSML server device;
in response to receiving the invocation of the HTTP connection constructor function, returning, by the computing device, a HTTP connection object to the application;
receiving, at the computing device, an invocation by the application of a begin session function of the HTTP connection object;
in response to receiving the invocation of the begin session function, establishing, at the computing device, a session identifier;
receiving, at the computing device, a first invocation by the application of a send request function of the HTTP connection object, the invocation of the send request function specifying the first DSML request object;
in response to receiving the first invocation of the send request function:
automatically modifying, by the computing device, the first DSML request document to include a session identifier element that specifies the session identifier; and
after automatically modifying the first DSML request document, sending, by the computing device, a first Hypertext Transfer Protocol (HTTP) request that comprises the first DSML request document from the computing device to the DSML server device via a computer network;
receiving, at the computing device, a HTTP response from the DSML server device, the HTTP response comprising a DSML response document that includes an add response element that indicates a result of the add request element; and
returning, by the computing device, to the application a DSML response object that represents the DSML response document;
receiving, at the computing device, an invocation by the application of a response element function of the DSML response object;
in response to receiving the invocation of the response element function, returning, by the computing device, to the application an object that represents the add response element;
after receiving the first invocation of the send request function, receiving, at the computing device, an invocation by the application of an end session function of the HTTP connection object;
after receiving the invocation of the end session function, receiving, at the computing device, a second invocation by the application of the send request function of the HTTP connection object, the second invocation of the send request function specifying a second DSML request object that represents a second DSML request document; and
in response to receiving the second invocation of the send request function and without automatically modifying the second DSML request document to include the session identifier element, sending a second HTTP request from the computing device to the DSML server device via the computer network, the second HTTP request comprising the second DSML request document.

17. The method of claim 16, wherein the computing device comprises a processing unit, a system memory, and a system bus coupling the system memory and the processing unit, the system memory storing computer-executable instructions that, when executed by the processing unit, cause the computing device to perform each step of claim 16.

18. The method of claim 16, further comprising: executing the application at the computing device.

* * * * *